Jan. 21, 1941. W. T. AMNEUS 2,229,023
TIRE INFLATER
Filed May 11, 1938
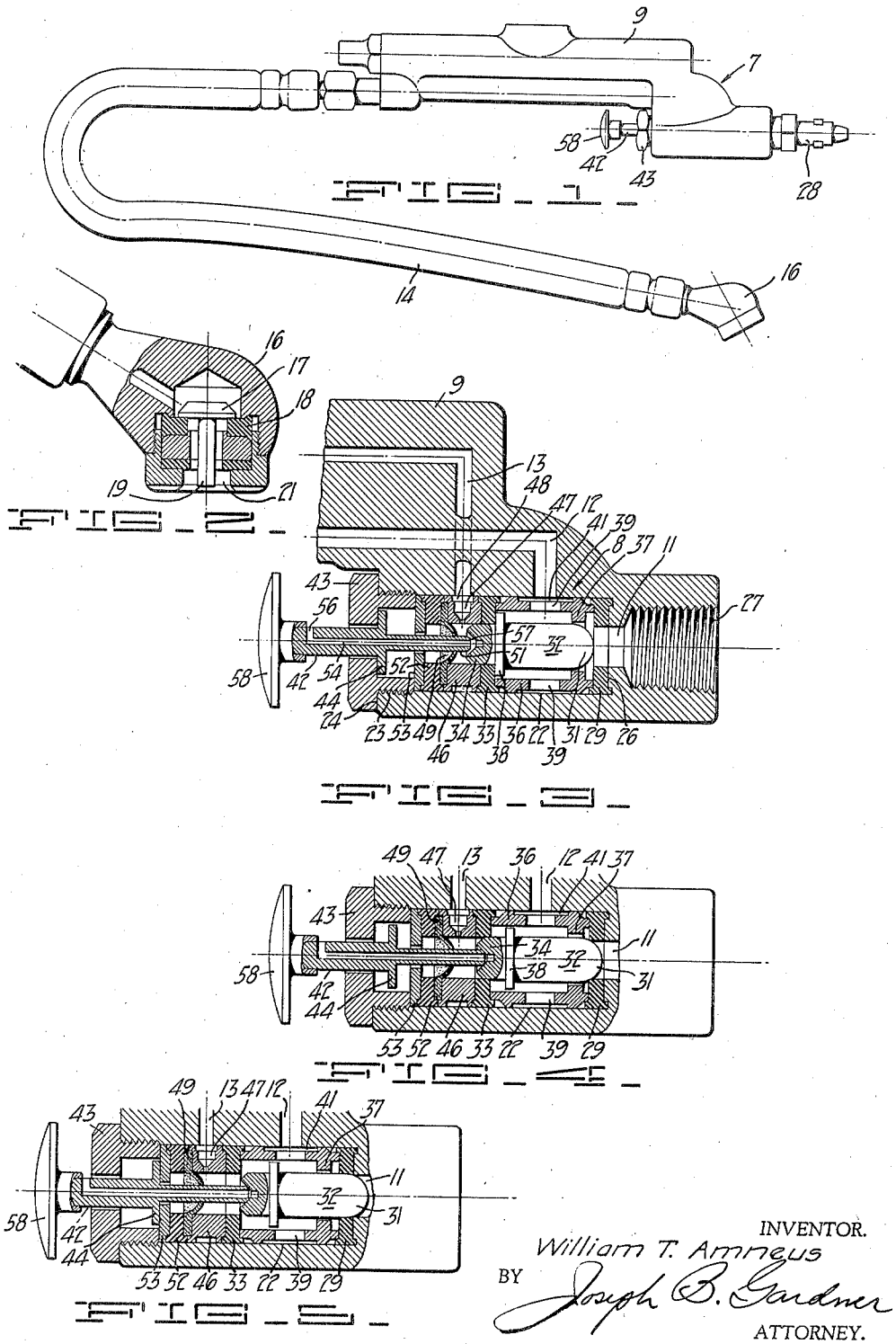
INVENTOR.
William T. Amneus
BY Joseph B. Gardner
ATTORNEY.

Patented Jan. 21, 1941

2,229,023

UNITED STATES PATENT OFFICE 2,229,023

TIRE INFLATER

William T. Amneus, Emeryville, Calif.

Application May 11, 1938, Serial No. 207,297

7 Claims. (Cl. 137—69.5)

The invention relates to tire inflaters of the type commonly used in service stations, garages and the like for inflating pneumatic tires.

An object of the present invention is to provide an air inflater of the character described, which embodies in a single unit a valve mechanism and a gauge which is adapted for connection to a source of air under pressure and a tire to be inflated, and which provides for the direct inflation of the tire without any manipulation of the valve mechanism and involves only a simple shifting of the valve mechanism to connect the gauge to the tire being inflated to determine the air pressure of the tire.

Another object of the invention is to provide a tire inflater of the character described having an improved valve mechanism which is simply constructed of a minimum number of parts wherein the wearing parts are confined to a few standard inexpensive washers, whereby the device will have a substantially unlimited operating life with the making of a minimum number of repairs and replacement of parts.

A further object of the invention is to provide a tire inflater of the character described which may be quickly and easily dismembered by the user for inspection, cleaning or repair of the device.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a side elevation of a tire inflater constructed in accordance with the present invention.

Figure 2 is an enlarged elevation shown partly in cross-section of the tire chuck of the inflater.

Figure 3 is an enlarged cross-sectional view of the valve mechanism and associated passages of the inflater and shown with the parts in normal position for inflating a tire.

Figure 4 is a view similar to Figure 3 but showing parts moved to a position intermediate the inflating and gauge actuating positions of the valve.

Figure 5 is a cross-sectional view similar to Figures 3 and 4 but showing the parts of the valve mechanism in position connecting the gauge to the tire.

The tire inflater of the present invention and as illustrated in the accompanying drawing, comprises a body or casing 7 which embodies a valve mechanism 8 and a gauge 9, and is provided with suitable passages 11, 12 and 13 for connection of the valve mechanism to a source of air under pressure, a tire and the gauge respectively. As a principal feature of the present inflater, the passage 11 is normally connected directly with the passage 12 so that a tire may be inflated without any manipulation of the valve mechanism. As here shown, a flexible conduit 14 is connected to the body in registration with the passage 12, and is provided at its free end with a chuck 16 adapted for connection to the valve stem of a tire. Due to the normal connection of the air pressure passage 11 and delivery passage 12, and to prevent a free discharge of air from the conduit 14, the chuck 16 is provided with a check valve 17 which is normally held by the pressure in the line, sealed against a valve washer seat 18. The valve 17 is provided with a stem 19 which extends longitudinally through an open portion 21 in the end of the chuck and may be displaced to unseat the valve 17 by the tire valve stem upon applying the chuck thereto. In this way the valve mechanism 8 remains inoperable during the inflation of the tire, and while the air pressure source is communicated to the tire or sealed off by the operation of the check valve in the chuck.

The essential function of the valve mechanism is to interrupt the communication of passages 11 and 12 and to establish a communication between passages 12 and 13, so as to stop the inflation of a tire and to allow the pressure in the tire to be applied to the gauge 9. A further function of the valve mechanism is to relieve the pressure applied to the gauge when the mechanism is returned to a normal inflating position. Ordinarily it has been common to use various springs and the like to assist in the manipulation of the valve mechanism. In the present case, however, the return movements of the valve mechanism are effected without the use of springs or the like by taking advantage of the pressure in the supply line and maintaining a pressure differential across the movable valve for constantly urging the same to a normal inoperative position as aforesaid. Also, the present valve mechanism has been designed to positively prevent the direct application of the source pressure to the gauge and the communication between the gauge and the tire cannot be established until after the source pressure has been disconnected from the tire.

The valve mechanism as here shown, is contained within a valved chamber 22 which is preferably of elongated, cylindrical form and is arranged with its outer end 23 opening to a side 24 of the body. The passage 11 is preferably positioned to open to the inner end 26 of the chamber substantially coaxial therewith, and is connected to a threaded socket 27 in the body adapted for receipt of one end 28 of a coupling section. The passages 12 and 13 are preferably positioned to enter the chamber 22 at the longitudinal side thereof with the passage 12 adjacent the inner end 26 and the passage 13 spaced outwardly therefrom. A sealing washer 29 is preferably mounted at the inner end 26 of the chamber and defines a seat for one end 31 of a valve 32. A second sealing washer 33 is mounted in the chamber intermediate the passages 12 and 13 and provides a seat for an opposite end 34 of the valve 32. The valve 32 is preferably of cylindrical form and is of a diameter slightly larger than the normal unexpanded internal diameters of the washers 29 and 33, so that upon forced longitudinal movement of the valve, the same will enter into and expand the open central portions of the washers and tightly seat the valve therein to seal the passage therethrough. To facilitate the mounting of the washers and valve within the chamber, I prefer to insert a sleeve 36 in the chamber between the washers and against the ends of which the washers may abut. The sleeve is ported to the passage 12 by way of radial openings 39 which, as here shown, communicate the interior of the sleeve with a circumferential channel 41 mounted in registration with the passage 12. The sleeve is also provided adjacent its inner end with a shoulder 37 for centering the adjacent end of the valve and to guide the latter into and from the open center portion of the washer 29. Likewise, the valve 32 is preferably provided with an annular shoulder 38 for supporting the valve in substantially central position within the sleeve, and which has the further function of engaging the washer 33 to provide a stop for the outward movement of the valve. Preferably, the shoulders 37 and 38 only loosely engage the valve and the sleeve respectively, so as to not interfere with the passage of air therebetween. Preferably, the opposite ends 31 and 34 are rounded or beveled, as here shown, in order to facilitate the entry and wedging of these ends into the open center portions of the washers. The washers are preferably made of rubber or other compressible material of suitable hardness to properly cooperate with the valve in sealing the passages.

It will be seen from the above that the end 31 of the valve is disposed immediately in front of the air pressure passage 11 and preferably, the opposite end 34 of the valve is arranged in a chamber of reduced pressure so that the valve will be normally urged by the pressure differential across the valve to an outward position, removing the end 31 of the valve from the washer 29, as illustrated in Figure 3. In this manner the pressure passage 11 is communicated directly with the passage 12 and the applied pressure is utilized to supply a force for constantly urging the valve to an outward inoperative position.

The valve may be displaced inwardly to engage the washer 29 to seal the pressure passage 11 as aforesaid, and in such position the opposite end 34 becomes spaced from the washer 33, as illustrated in Figure 5, so as to allow the air to flow from the tire passage 12 outwardly through the washer 33, to the gauge passage 13. In order to prevent the application of the pressure in the passage 12 to the gauge, the valve 32 is of such a length relative to the washers 29 and 33 as to firmly engage the washer 29 prior to disengagement of the washer 33, as shown in Figure 4, and only disengages the washer 33 after the same has penetrated a substantial distance through the interior of the washer 29, as indicated in Figure 5. In this manner, it will be clear that the manipulation of the valve to communicate the passages 12 and 13 will automatically cause a sealing off of the passage 11 prior to the establishment of such communication and, therefore, the gauge will be always positively protected from the pressure of the source of compressed air.

The longitudinal movement of the valve 32 to connect the gauge to the tire as aforesaid, is arranged to be effected in the present construction by an operating member 42 extended longitudinally through the outer end of the valve chamber for engagement of the valve end 34. The member 42 may be supported for longitudinal reciprocation by a closure 43, here shown threaded into the outer end 23 of the chamber, and may be held against outward withdrawal from the chamber by means of a shoulder 44 provided on the member and which in the outward position thereof is arranged to abut the inner side of the closure. An enlarged head portion 58 is provided on the outer end of the member 42 for engagement by the fingers of the user. Preferably, the washer 33 is supported longitudinally against the end of a sleeve 46 which is mounted in the chamber opposite the passage 13 and is ported by means of a radial opening 47 extending from the interior of the sleeve to a channel 48 surrounding the sleeve. Mounted against the outer end of the sleeve 46 is a hat washer 49 which closely surrounds and seals the inner end portion 51 of the member 42. The hat washer 49 is in turn secured in place by a compressible washer 52 and the latter is supported at its outer end by a metal washer 53 clamped in place by the closure 43. The washer 53 also preferably loosely supports the member 42 in approximately center position within the chamber. It will be noted that each of the above parts of the valve mechanism may be assembled through the open outer end of the valve chamber and fitted tightly against each other by a longitudinal pressure applied by threading of the closure 43 into the chamber. The normal reduction of pressure in the portion of the chamber outwardly of the valve end 39 is effected by venting this portion of the chamber to the atmosphere in the normal position of the valve mechanism, that is when the gauge is not in use. Upon movement of the valve mechanism to connect the tire passage 12 to the gauge passage 13, however, the atmospheric connection of the chamber is closed off so as to seal the tire and gauge passages in communication without loss of air to the atmosphere. The closing of the chamber connection to the atmosphere and displacement of the valve 32 to communicate the tire and gauge passages as aforesaid, is here arranged to be accomplished in a single step by providing the atmospheric connection for the chamber directly in the member 42, so that on movement of the latter to engage the valve, the atmospheric connection will be closed. This is effected by forming the member 42 of a tubular stem-like construction having an internal longitudinal passage 54 communicated at a side 56 of the stem externally of the closure 43 and communicated directly to the inner end face 57 of the member, so that the passage will be automatically closed upon engagement of the inner end face 57 with the valve end 34 to displace the valve. Preferably, in order to ensure a proper sealing of the inner end of the passage 54, the end face 57 of the member and the end face 34 of the valve are tapered to interfit and provide a sealed engagement of the end 57 in the end wall of the valve.

The operation of the valve mechanism, as will be clear from the foregoing, is as follows: The valve 32 will be normally positioned to uncover the washer 29 and communicate passages 11 and 12 by the action of the applied pressure on the end face 31 of the valve. Whereupon, to inflate a tire, it is only necessary to apply the chucks 16 to the valve stem of the tire. After suitable inflation has been effected, the pressure in the tire may be ascertained by the gauge 9 embodied in the inflater by pressing the manual valve control member 42 inwardly to forcibly displace the valve 32, against the resistance of the applied pressure, into the washer 29 to seal off the input passage 11. This movement of the valve causes the uncovering of the washer 33, as indicated in Figure 5, and thereby communicates the tire passage 12 to the gauge passage 13, the air being sealed from the atmosphere in such position of the valve principally by the hat washer 49, and the closing of the passage 54 in the operating stem by engagement of the open end 57 thereof with the valve. After reading of the pressure of the tire, the inflating operation may be resumed by releasing the member 42 and allowing the applied air pressure to return the same to initial position, as indicated in Figure 3, when the passage 11 will again be communicated with the passage 12 and the gauge passage 13 effectively sealed from both of the passages 11 and 12. The air pressure in the gauge will cause the further outward movement of the member 42 to space the end 57 of the member from the valve to thereby open the passage 54 in the member 42 and release the air in the gauge to the atmosphere.

Any type of gauge at present used in connection with tire inflating equipment may be used in the present inflater.

I claim:

1. A tire inflater adapted for use with a tire chuck having a displaceable check valve and provided with a passage adapted for connection to a source of air under pressure and a second passage adapted for connection to said chuck and a third passage adapted for connection to a gauge, and valve means normally placing said first and second passages in communication and being manually displaceable first to close said communication and then to communicate said second and third passages, said first and second passages being closed off entirely before the communication of said second and third passages is made to withhold pressure from said source from said gauge.

2. A tire inflater adapted for use with a tire chuck having a displaceable check valve and provided with a passage adapted for connection to a source of air under pressure and a second passage adapted for connection to said chuck and a third passage adapted for connection to a gauge, mounted in said first passage and responsive to the pressure therein for displacement of said means by said pressure to a position placing said first and second passages in communication and being manually displaceable against the resistance of the pressure in said first passage to discommunicate said first and second passages and to communicate said second and third passages in progressive order whereby said pressure passage will be sealed off from said tire passage prior to communication of said tire and gauge passages.

3. A tire inflater provided with a passage adapted for connection to a source of air under pressure and a second passage adapted for connection to the valve stem of a tire, a third passage adapted for connection to a gauge, a valve chamber connecting said first and second passages, a valve in said chamber and movable to and from a position closing said first passage and movable to a second position connecting said second and third passages, means providing an air pressure differential across said valve and normally holding the same out of said first position, and a manually displaceable member for moving said valve to said second position, said valve being arranged in said valve chamber to prevent connection of said first and third passages.

4. A tire inflater adapted for use with a tire chuck having a displaceable check valve and provided with a passage adapted for connection to a source of air under pressure and a second passage adapted for connection to said chuck, a valve chamber connected to each of said passages, a valve mounted in said chamber and movable to and from a position engaging an end thereof to seal said first passage, a manually displaceable valve actuating member mounted in said chamber and having a tubular portion extending to the outside of said chamber and to an end of said member inside said chamber to vent said chamber to the atmosphere and establish a pressure differential across said valve normally urging the same from said position, said member being displaceable to engage said end thereof against said valve to close the tubular portion of said member and to displace said valve against the resistance of said pressure differential to said position.

5. A tire inflater as characterized by claim 4 wherein the tubular end of said member and said valve are provided with a tapered interfit to seal said tubular end.

6. A tire inflater comprising, a body having an elongated valve chamber opening to a side of said body and provided with a passage adapted for connection to a source of air under pressure and opening to the inner end of said chamber and a passage adapted for connection to a tire opening to a side of said chamber adjacent said inner end and a passage adapted for connection to a tire opening to a side of said chamber outwardly of said tire passage, a washer at the inner end of said chamber, a washer in said chamber intermediate said tire and gauge passages, a valve mounted for reciprocation within said chamber between said washers and being of a length capable of simultaneously engaging both of said washers and being extendible through the openings in said washers to clear either of said washers while sealing off the other, a closure for the open outer end of said chamber, and a stem member mounted for reciprocation through said closure to engage and displace said valve to said first washer against the resistance of the air pressure in said first passage to open said second washer and communicate said tire and gauge passages.

7. A tire inflater comprising, a body having an elongated cylindrical valve chamber having a threaded outer end portion opening to a side of said body, said body being provided with a plurality of passages adapted for connection to a source of air under pressure and a tire and a gauge and opening to said chamber respectively at the inside end thereof with said tire and gauge passages spaced outwardly therefrom in the order named, a washer at the inner end of said chamber surrounding said air pressure passage, a sleeve in said chamber having one end abutting said washer and ported to said tire passage, a washer abutting the opposite end of said sleeve, a cylindrical shaped valve mounted in said sleeve for reciprocal movement therein and having an end portion slidably mounted in said second washer and having a rounded opposite end adapted to engage said first washer and extend into and seal the opening therein to close said pressure passage, centering shoulders on said valve and sleeve for guiding said valve to the opening in said first washer, said valve being of a length capable of simultaneously engaging both of said washers and being extendible through the openings in said washers to clear either of said washers while sealing off the other, a second sleeve abutting the outer side of said second washer and ported to said gauge passage, a hat washer engaging the outer end of said second sleeve, a closure member threaded into the outer end of said chamber, and a stem member mounted for reciprocation through said closure and hat washer and arranged to engage the inner end thereof with said valve and provided with an internal longitudinal passage opening to said end and to the side of said member at the exterior of said chamber.

WILLIAM T. AMNEUS.